(12) United States Patent
Capeau et al.

(10) Patent No.: US 11,623,882 B2
(45) Date of Patent: Apr. 11, 2023

(54) WATER CLARIFICATION METHOD AND DEVICE

(71) Applicant: Orege, Jouy en Josas (FR)

(72) Inventors: Patrice Capeau, Aix en Provence (FR); Michel Lopez, Coursan (FR); Pascal Gendrot, Jouy en Josas (FR)

(73) Assignee: Orege, Voisins-le-Bretonneux (FR)

( * ) Notice: Subject to any disclaimer, the term of this patent is extended or adjusted under 35 U.S.C. 154(b) by 0 days.

(21) Appl. No.: 16/040,635

(22) Filed: Jul. 20, 2018

(65) Prior Publication Data

US 2018/0327289 A1  Nov. 15, 2018

Related U.S. Application Data

(63) Continuation of application No. 13/881,508, filed as application No. PCT/FR2011/000583 on Oct. 28, 2011, now Pat. No. 10,029,930.

(30) Foreign Application Priority Data

Oct. 29, 2010 (FR) ...................................... 10/04285

(51) Int. Cl.
*C02F 1/54* (2023.01)
*B01D 21/01* (2006.01)
(Continued)

(52) U.S. Cl.
CPC ................ *C02F 1/54* (2013.01); *B01D 21/01* (2013.01); *B01D 21/02* (2013.01); *B01D 21/286* (2013.01); *C02F 11/06* (2013.01); *C02F 11/147* (2019.01); *C02F 1/20* (2013.01); *C02F 1/74* (2013.01); *C02F 2209/40* (2013.01); *C02F 2301/066* (2013.01); *C02F 2303/06* (2013.01)

(58) Field of Classification Search
CPC ....................................................... C02F 1/54
See application file for complete search history.

(56) References Cited

U.S. PATENT DOCUMENTS 2,751,335 A    6/1956  Carver
2,766,203 A   10/1956  Brown
(Continued)

FOREIGN PATENT DOCUMENTS

| | | |
|---|---|---|
| EP | 0514543 A1 | 11/1992 |
| FR | 2175897 A1 | 10/1973 |
| GB | 1429370 A  | 3/1976  |

OTHER PUBLICATIONS

International Search Report, in PCT/FR2011/000583 dated Dec. 23, 2011.
(Continued)

*Primary Examiner* — Peter Keyworth
(74) *Attorney, Agent, or Firm* — Banner & Witcoff, Ltd.

(57) ABSTRACT

The invention relates to a method and device for clarifying water by means treatment of the colloidal structures contained in a liquid and/or a sludge supplied in a continuous flow at a flow rate of $Q_{EB}=V_{EB}$/hour. The flow is sprayed into a chamber under overpressure conditions in relation to atmospheric pressure, said chamber having a volume $v<V_{EB}/20$, and air being injected simultaneously therein at a flow rate d.

20 Claims, 3 Drawing Sheets

(51) Int. Cl.
*B01D 21/02* (2006.01)
*B01D 21/28* (2006.01)
*C02F 11/06* (2006.01)
*C02F 11/147* (2019.01)
*C02F 1/20* (2023.01)
*C02F 1/74* (2023.01)

(56) References Cited

U.S. PATENT DOCUMENTS

| | | |
|---|---|---|
| 3,493,501 A | 2/1970 | Eck |
| 4,415,452 A | 11/1983 | Heil et al. |
| 4,457,842 A * | 7/1984 | Bereiter ................ B01D 21/02 |
| | | 175/206 |
| 5,833,865 A * | 11/1998 | Harato .................. B01D 21/01 |
| | | 210/733 |
| 5,935,448 A | 8/1999 | Miller |
| 6,214,228 B1 | 4/2001 | Jones et al. |
| 7,235,175 B2 | 6/2007 | Brisset |
| 2006/0196835 A1* | 9/2006 | Shimamura .......... B01D 9/0036 |
| | | 210/712 |
| 2011/0284376 A1* | 11/2011 | Ng ........................ B01D 61/54 |
| | | 204/520 |

OTHER PUBLICATIONS

Thomas D N et al; "Flocculation Modelling: a Review"—Review Paper, May 1, 1999, pp. 1579-1592.

* cited by examiner

WATER CLARIFICATION METHOD AND DEVICE

CROSS-REFERENCE TO RELATED APPLICATIONS

This application is a continuation of co-pending U.S. application Ser. No. 13/881,508, filed Apr. 25, 2013, which is a US national stage of PCT/FR11/000583, filed Oct. 28, 2011, which claims priority to FR application no. 10/04285, filed Oct. 29, 2010. Each of the above-mentioned patent applications is incorporated by reference in its entirety.

BACKGROUND OF THE INVENTION

The present invention relates to a method for clarifying water by treating colloidal structures present in a liquid and/or a sludge fed in continuous flow at a specified rate.

It also relates to a device enabling such treatment.

The invention finds particularly significant, though not exclusive, application in the field of the clarification of thick water—for example, water containing dry matter (DM), and in the field of sludge dewatering.

The majority of waste water, polluted water, muddy water or sludgy water comprises colloids, which are present either in the solid parts in suspension, especially in their organic fraction, or in the water itself.

These colloids give the effluent as a whole a coloring and characteristics of opacity, a source of disadvantages.

By attacking these colloidal structures, the invention aims to produce an effluent which after treatment is particularly transparent.

There are already methods known for at least partly eliminating the presence of colloids.

These methods essentially involve adding, in the treatment process chain, one or more coagulants and then flocculants, in amounts sufficient to agglomerate and fix the colloids, which are subsequently removed, for example, by settling or centrifuging.

The prior-art methods, however, do not allow sufficient removal of the colloids from the liquid effluent, which often remains of high turbidity and/or with a solid fraction of high water content.

Such treatments then give rise to substantial costs for transport, and, in general, for supplementary combustion.

SUMMARY OF THE INVENTION

With the invention it will be possible to reduce the amount of sludge while producing water of high purity, without addition of reagents in substantial amount.

Colloidal particles are known to have two essential characteristics.

They have a very small diameter (from 1 nm to 1 µm) and carry an electronegative charge, giving rise to intercolloidal repulsion forces.

These two characteristics give the colloids an extremely low sedimentation rate, which may even be considered to be zero in the context of water treatment.

With the known coagulation/flocculation treatments, this problem is solved as follows.

In a first stage, coagulation, by addition of metal salts (generally iron salts or aluminum salts), suppresses the intercolloidal repulsion. The metal cations ($Al^{3+}$ and $Fe^{3+}$) bind to the colloids and neutralize them. The colloidal particles are able thereafter to collide.

In a second stage, flocculation addresses the problem of the small diameter of the colloids. Indeed, their low mass does not allow a natural sedimentation that can be exploited in the context of a treatment.

Through the addition of flocculant, the agglomeration of the colloidal particles is brought about, and the agglomerate of colloids, referred to as a floc, has sufficient mass to be able to settle.

The flocculant added is generally a polymer, either organic or natural.

The invention starts from a concept which is radically different from the concepts of the prior art, for removing the colloids.

To accomplish this, the invention aims to introduce a high energy (>10 000 J) into the colloid-loaded effluent, which is both liquid and sludgy, all in a confined and oxidizing (air) medium, in order, surprisingly, to bring about the loss of the negative characteristics of the colloids that prevent their removal.

Applied to the dewatering of sludge, the method facilitates liquid/solid separation and produces an excellent result, whether implemented alone or in combination with other separation techniques such as centrifuging or filtration.

In particular, this method produces excellent results on its own for highly mineralized sludges (i.e., those having a % of organic matter per 100% by weight of dry matter of less than from 5 to 15%).

With less mineralized sludges, it is possible to obtain an optimized yield when the method is combined with a complementary separation tool downstream of the device (belt filter or centrifugation), that enhances solids increase by more than 10%, as for example by 25%.

Existing plants can therefore be easily enhanced by addition of one or more reactors that implement the invention, and this, subsequently and for example, will save on the costs of transport and final incineration of the sludge.

The invention, furthermore, exhibits very low electrical consumption and does not use very much consumable material (compressed air, additive).

Moreover, the method employs a simple and very compact device which is easily transportable and which will therefore be able to be installed on sites without easy access.

Continuous operation is possible with the invention, with very relaxed constraints on exploitation.

The treatment according to the invention, furthermore, does not give rise to any pollution, while employing a technique which is itself much more economical than those known in the field of liquid/solid separation (centrifuge, press filter, belt filter, continuous oxygenated recirculation, etc.).

Lastly, the invention, surprisingly, produces a new type of porous dewatered cake that constitutes a useful residue.

For this purpose, the invention essentially provides a method for clarifying by treating the colloidal structures present in a liquid and/or sludge fed in continuous flow at a rate $Q_{EB}=V_{EB}$/hour, characterized in that the flow is sprayed into a chamber in overpressure in relation to the atmospheric pressure, said chamber being a continuous or semicontinuous flow passage chamber having a volume $v<V_{EB}/20$, with simultaneous injection of air into the chamber at a rate d below the feeding of the flow, into said chamber.

In the definition above, the value $V_{EB}$ is of course a volume value, expressed for example in $m^3$.

By chamber is meant a tank or a reactor of specified closed volume, comprising an inlet for the flow and an outlet for the flow after treatment, with a cross section more limited than that of the reactor.

The chamber is therefore a chamber for passage of the flow under pressure.

By a value $v<V_{EB}/20$ or $v<5\%\ V_{EB}$ is meant a value less than or approximately less than, with a tolerance of the order of ±10% to 20%.

Advantageously $v \leq V_{EB}/25 \leq V_{EB}/50$.

In one advantageous embodiment of the invention the excellent results are attained in particular by virtue of the combination of a plurality of functions in the same small-sized chamber, by providing four functional zones:

A zone for introduction of slightly compressed air, this zone also hosting suspension, or prevention of settling, of the heaviest particles, which are nevertheless capable of rising within the reactor and of emerging in the top part with the finest particles.

A hydraulic impact zone in which the liquid flows are introduced.

A rise zone of the bed, consisting, for an amount by weight of approximately 1 of gas, of 0.1 of water and of 0.01 of solid. Within this zone, very vigorous agitation is made possible by the provision of air of the recommended quality (rate and pressure).

A decompression zone, regulated for example by a slide valve situated at the top part of the reactor. In the example of this slide valve, the valve is required to maintain the reactor at a relative pressure of approximately 0.5 to 2 bar.

With the invention it is therefore possible to transmit a high kinetic energy on the basis of the kinetic energy of pumping, which is converted to impact energy inside a small volume.

The simultaneous introduction of an amount of air increases the energy level of the small-sized chamber, by further increasing the turbulence.

The hydraulic regime in the chamber is therefore arranged so as to be highly turbulent ($R_e >>$ to 3000), and this, in combination with the oxidation associated with the injection of air, brings about the removal or breaking of the colloidal structures.

The reason is that the collisions between the air, the water, and the sludge bring the air inside the solid, by physical replacement of part of the interstitial water between colloids by the air, while at the same time providing the oxidation of the effluent.

For example, in an industrial sludge obtained from the petroleum industry, and with a high load of DM (>20 g/l) containing 90% of organic matter, solids increase by filter or centrifuging has been observed to give a residual water which is colored and turbid, a sign that it still contains colloids, whereas, when using the method according to the invention (prior to another means of solids increase or otherwise), the residual water obtained is transparent, with a COD of less than 300 mg/l, in other words devoid of colloids as far as the skilled person is concerned.

Lastly, and unexpectedly, it has been observed that the method according to the invention allowed the stripping of the molecules dissolved in the water, giving rise to substantial depollution and thus further aiding the desired clarification.

The flow is advantageously formed from at least two partial flows, which are sprayed one onto another.

In advantageous embodiments, use is also made of one and/or another of the following provisions:

the flow is injected into the chamber via two identical opposite orifices situated in the lower half of said chamber, the air being injected below said orifices, and the air, water, and sludge escaping at the top part of the chamber;

the air is injected at a rate $d>1.5\ Q_{EB}$, as for example greater than 5 $Q_{EB}$, then 10 $Q_{EB}$, or of between 1.5 times and 15 times $Q_{EB}$;

the air is injected at average pressure. By average pressure is meant between 1.4 bar and 2.5 bar, advantageously between 1.6 bar and 1.9 bar. Such a pressure generates larger bubbles, which will be able to penetrate the medium more effectively, by being distributed randomly within the chamber.

$V_{EB} \geq 50\ v$;

$V_{EB} \geq 100\ v$;

at least one liquid reagent is added continuously at a rate q to the interior of the chamber;

the rate $Q_{EB}$ is greater than or equal to 15 m3/h, the rate d is greater than or equal to 25 m3/h, and the relative pressure in the chamber is greater than or equal to 0.8 bar;

the rate $Q_{EB}$ is greater than or equal to 20 m3/h, the rate d is greater than or equal to 50 m3/h, and the relative pressure in the chamber is greater than 1.2 bar;

the liquid reagent is a cationic organic flocculant.

the effluents are degassed on emergence from the chamber and the gases obtained are used to feed the injection of air at the bottom part.

The invention also provides a device for treating colloidal structures present in a liquid and/or sludge fed in continuous flow at a rate $Q_{EB}=V_{EB}$/hour, characterized in that it comprises a closed chamber of volume $v<V_{EB}/20$ comprising at least two identical opposite orifices situated in the lower half of said chamber, means for collecting the sludge and for feeding the flow of sludge thus collected into said chamber in at least two partial flows each, respectively, injected via one of said orifices, means for feeding air to the chamber at a rate d below said orifices, and means for removing the flow, arranged so as to maintain the chamber at overpressure.

The flow is advantageously removed at the top part via a pressure relief valve which releases above a specified threshold value.

Also advantageously the volume $v \leq V_{EB}/50$.

Also advantageously the volume $v \leq V_{EB}/100$.

In another advantageous embodiment, the device comprises means for feeding a liquid reagent at a specified rate directly into the chamber.

BRIEF DESCRIPTION OF THE DRAWINGS

The invention will be better understood from a reading of the description that follows of embodiments which are given as nonlimitative examples. The description makes reference to the accompanying drawings, in which.

DETAILED DESCRIPTION OF THE INVENTION

Figure 1:
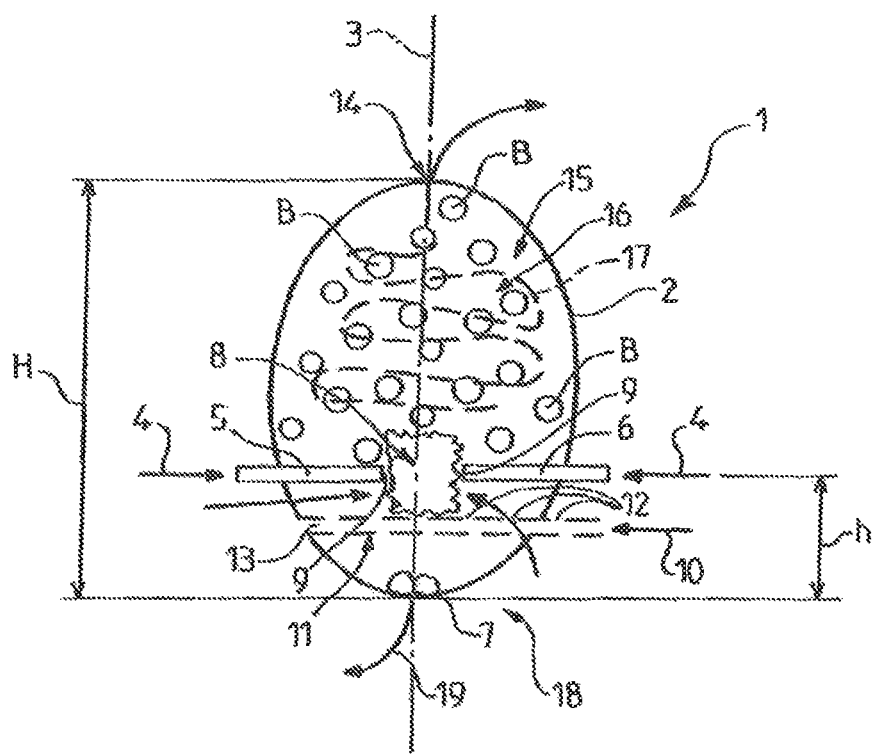
FIG. 1 is a scheme illustrating the principle of the method of treatment according to one embodiment of the invention.

FIG. 1 shows the principles of the method for treating or breaking the colloidal structures present in an effluent, according to the embodiment of the invention more particularly described here.

In a reactor 1 formed by an oblong chamber 2 which extends about an axis 3, and has a small volume v of the order, for example, of 50 liters, the effluents (arrows 4) are injected via two opposite ports 5 and 6 which are symmetrical with respect to the axis 3 of the chamber.

The ports are situated at the bottom part of the chamber, as for example at a distance h from the base 7 of the chamber, between one fifth and one third of the height H of the chamber.

These two ports, situated opposite one another, allow the flow of water highly loaded with dry matter (DM) (for example T of DM 10%/total weight) to be fed under pressure, giving rise to a substantial impact where the two flows meet in the zone 8.

In other words, the pumping of the waters from the outside (not shown) that are introduced into the chamber of the small-sized reactor 1, via the opposing ports, produces an impact between the flows in the zone 8, owing to the outlet pressure of the feed pump or pumps (not shown), which is dependent on the height of water in said feed pumps upstream of the ports, and on the head losses in the circuit.

Conventionally, using commercial industrial pumps and a circuit without excessive faults, a pressure of 2 bar at the outlet 9 of the ports into the chamber is readily attainable.

The kinetic energy of pumping is then converted into impact energy, which is maximized by increasing the velocity of introduction into the chamber for the outlet of the ports of regulator jets 9 of reduced size, but compatible with the maximum particle size of the sludge.

Furthermore, and according to the embodiment of the invention more particularly described here, an amount of pressurized air (arrow 10) is introduced below the zone 8.

By pressurized is meant a slight overpressure, which may be between 0.1 bar relative and 1 bar relative in relation to the atmospheric pressure, as for example 0.8 bar relative.

This air is introduced via an air distribution ramp 11, for example a ramp formed by a circular, coiled or rectilinear pipe, allowing bubbles of air to be introduced with distribution over the surface of the chamber, via orifices 12 which are spread along said pipe 13.

The air may also be brought via a port at the bottom part.

The ramp is situated below the meeting point of the effluents in zone 8, as for example between one tenth and one fifth of the height H of the chamber, and produces large bubbles B, with a bubble diameter for example of between 1 mm and 1 cm.

This introduction of air increases the energy level in the chamber, which is in overpressure in relation to its outlet 14 for removal of the effluents after treatment.

In the upper part 15 of the chamber, a functional zone 16 is obtained as well, in which extremely turbulent mixing, featuring Brownian motion (dashed line 17), is realized.

At the bottom part 18 of the reactor, conventionally, a purge 19 is provided for elements which are too dense, which do not escape via the top of the reactor, this purge being emptied sequentially.

Escaping at the outlet 14 of the reactor are air, water, and the sludges to give, after decanting, transparent water which is physically separate from the solid material, with a very low solid matter content, of less, in particular, than 30 mg/l or even than 10 mg/l, while initially the solid matter content could have approached more than 500 mg/l.

The decolloidized solid matter obtained at this point is more porous and, consequently, is readily compactable. Depending on its initial level of organic matter, it may even be directly pelletizable on emergence from the reactor.

The air is introduced at an average pressure, for example, of between 1.6 bar and 1.9 bar absolute to the pressure in the chamber itself, so that there may be large bubbles in the mixture, which will be able to penetrate the mixture and become distributed randomly within the reactor, to produce the expected mixing.

The air is introduced, moreover, at a high rate d, in other words of 1.5 times to 15 times (in $Nm^3/h$) the rate $Q_{EB}$ of the incoming water (in $m^3/h$).

The gas extracted from the reactor emerges with the water and the sludge at the rate of the pressure booster, and can be recovered, treated, and, where appropriate, recycled for use again at the bottom part of the reactor.

It should be noted that the presence of coarse matter, of the sand, gravel, etc., type, increases the number of impacts and, consequently, enhances the process.

The pressure of the chamber, in turn, is arranged and/or regulated in such a way as to optimize the internal energy by generating an ascending flow emerging from the top.

Such a pressure is therefore determined as a function of the functional features of the circuit (water level of pumps), but also of the type of effluents and the desired treatment rates.

The size finally selected for the reactor will also be specified by the skilled person as a function of the basic knowledge of an engineer in the field of chemical engineering, and the diagram of the flows.

The pressure and the outlet are ensured, for example, via a valve which releases the flow when the given pressure is exceeded.

Since the method according to the invention employs stirring in three phases—solid, liquid, and gaseous—it is necessary at the outlet to carry out separation that takes account of the degassing, of the denser-than-water solid phase, and of the removal of the water.

In one advantageous embodiment, furthermore, a coagulant is added (e.g., lime, ferric chloride, etc.).

This complementary addition is made, for example, in the functional zone 16.

Accordingly, with a reactor having a diameter of 55 liters and injection nozzles into this reactor with a diameter of 40 mm, up to 20 $m^3/h$ of sludge can be treated.

Surprisingly it is observed, furthermore, with the method of the invention that when the pressure in the reactor is greater in terms of relative pressure at 0.8 bar, the feed rate $Q_{EB}$ of the sludgy water formed, for example, by water-spreading slurries with a DM (dry matter) load at 5%, said DM being obtained from the biodegradation of swamp grass, clay, sand, and various petroleum residues at trace levels (<1%), is greater than 15 $m^3/h$, and when the air rate d is greater than 25 $m^3/h$, exceptional separation is obtained, with a maximum decanting rate of a sludge which, after drying, has a new, porous, granular appearance.

With a 55-liter reactor and with 40 mm nozzles for injecting the effluent within, percussion rate values are obtained that are extremely rapid, and residence times in the reactor are obtained that are particularly short [cf. table I below).

TABLE I

| | m³/h | | | | | | | | | |
|---|---|---|---|---|---|---|---|---|---|---|
| Effluent flow | 1 | 2 | 3 | 4 | 5 | 6 | 7 | 10 | 15 | 20 |
| | m/s | | | | | | | | | |
| Percussion speed, solid particles | 0.111 | 0.221 | 0.332 | 0.442 | 0.553 | 0.774 | 1.105 | 1.658 | 2.210 | |
| | s | | | | | | | | | |
| Residence time, reactor | 198.00 | 99.00 | 66.00 | 49.50 | 39.60 | 28.29 | 19.80 | 14.80 | 9.9 | |

By virtue of the invention it is therefore possible to obtain advanced dewatering much better than that obtained by virtue of the existing techniques, and within a few seconds.

In addition to this appreciable time gain in the treatment, very low consumption of electricity, of compressed air, and of flocculant is required.

The low bulk of the chamber, furthermore, makes it readily transportable, and allows it to be installed in sites where access is difficult, while ensuring continuous operation in great simplicity.

The treatment according to the invention does not give rise to any pollution, and achieves this with a much more economical installation as compared with the other treatment systems to which consideration may be given for the task of liquid/solid separation alone, these being centrifuges, press filters, belt filters, etc.

By way of example, table II below reports the improvement A in solids obtained with the method according to the invention for a sludge from the Fos sur Mer industrial treatment station, this sludge having a low mineral content (90% of organic matter) in the field of petrochemicals.

The comparison is between a simple treatment on a belt filter (with a filtering cloth on which the water and sludge are removed by pumping and conveyed between squeeze rolls), and the same belt filter after pretreatment with the method according to the invention.

For a chamber volume v=55 l, variations were made in the parameters of sludge rate $Q_{EB}$ (m³/h), gas rate d (Nm³/h), and relative pressure P inside the chamber (bar), for a specified DM load at the inlet of the chamber (in g/l).

The results are also given in dependence on the initial condition of the sludges—that is, fresh (without intermediate storage), not very fresh (after storage for three days), or fermented (several days of storage in the absence of oxygen).

It is seen that a high gas rate (eight times the sludge rate) and a high pressure in the chamber (1.3 bar) enhances solids by 48.8% (trial #10) for a fairly low initial load (DM of 8.2 g/l), which demonstrates the efficacy of effective decolloidization.

On average (see trials #13 to 16) a fresh sludge loaded at 32.4 g/l for a gas rate twenty times greater than that of the sludges, and a pressure of 1 bar relative in the chamber, the method according to the invention increases the solids (dry matter (DM) content by weight relative to the total weight of the sludge, i.e.: DM+liquid) from 24 to 36.4%, or on average 30%.

TABLE II

| Trials # | Industrial sludge type, Fos sur Mer | Rate | | Chamber | | | |
|---|---|---|---|---|---|---|---|
| | | $Q_{EB}$ sludge m3/h | d gas Nm3/h | pressure P bar | Inlet DM g/l | Δ solids % | Outlet % |
| 1 | not very fresh | 2.8 | 40 | 0.5 | 24 | | 14.7 |
| 2 | not very fresh | 2 | 50 | 0.8 | 24 | | 20 |
| 3 | not very fresh | 3 | 60 | 1.4 | 28 | | 35.5 |
| 4 | not very fresh | 2 | 60 | 1 | 26 | | 22.1 |
| 5 | not very fresh | 2 | 60 | 1 | 26 | | 21.1 |
| 6 | not very fresh | 2 | 60 | 1 | 26 | | 20.4 |
| 7 | fresh | 1.5 | 60 | 1.1 | 26 | | 26.6 |
| 8 | fresh | 1.3 | 60 | 1 | 26 | | 22.2 |
| 9 | fresh | 1.2 | 60 | 0.8 | 26 | | 24.4 |
| 10 | fermented | 8 | 60 | 1.3 | 8.2 | | 48.8 |
| 11 | fermented | 6.2 | 60 | 1.1 | 11 | | 32 |
| 12 | fermented | 3 | 70 | 0.8 | 24 | | 26.2 |
| 13 | fresh | 3 | 60 | 1 | 32.4 | | 24 |
| 14 | fresh | 3 | 60 | 1 | 32.4 | | 26 |
| 15 | fresh | 3 | 60 | 1 | 32.4 | | 36.4 |
| 16 | fresh | 3 | 60 | 1 | 32.4 | | 30.1 |
| 17 | fresh | 4.4 | 40 | 1.6 | 32.4 | | 27.2 |
| 18 | fresh | 5.6 | 50 | 0.9 | 32.4 | | 33 |
| 19 | not very fresh | 6.5 | 60 | 0.5 | 24 | | 28.2 |

Shown subsequently in table III is an example of results obtained with a single device (without complementary treatment) on sediments (highly mineralized sludge) and with a complementary treatment (belt filter).

The treatment with the invention alone is to be compared with the belt filter alone, which does not exceed an improvement in solids of 15 to 18%.

Excellent results are obtained here even without complementary treatment with filter or centrifuge.

TABLE III

| Trials # | Industrial sludge type, Fos sur Mer | Rate | | Chamber pressure P bar | Inlet DM g/l | Δ solids % | Outlet % |
| --- | --- | --- | --- | --- | --- | --- | --- |
| | | $Q_{EB}$ sludge m3/h | d gas Nm3/h | | | | |
| 20 | sediments | 1.3 | 60 | 1.1 | 130 | | 61.6 |
| 21 | sediments | 1.2 | 60 | 1.1 | 84 | 56.7 | 69.5 |
| 22 | sediments | 1.3 | 70 | 1 | 84 | 43.2 Alone | 67.1 Alone + Filter |

Figure 2:
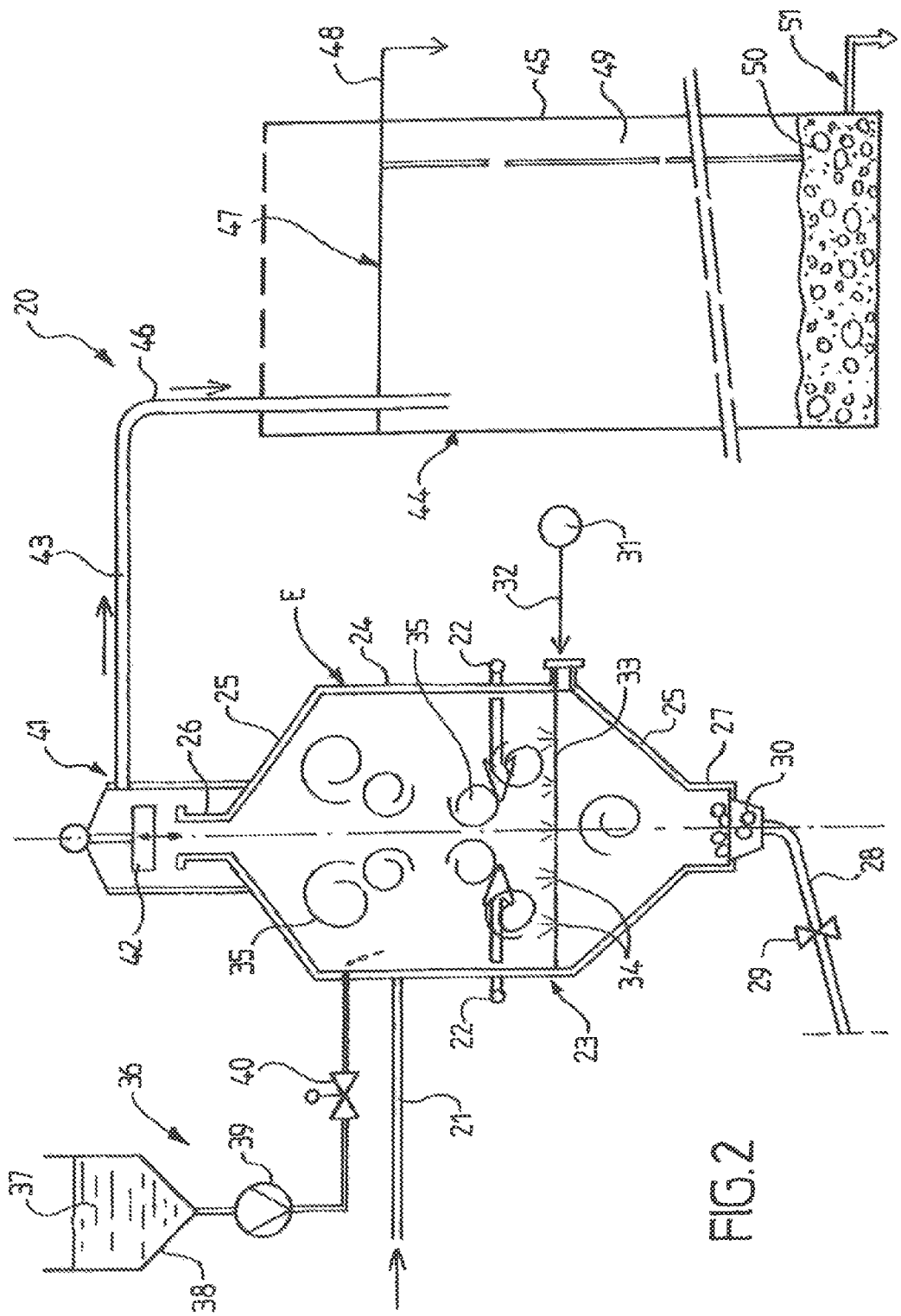
FIG. 2 is an operating scheme of one embodiment of a device according to the invention.

Shown in FIG. 2 is an operating scheme for a device 20 in accordance with the embodiment of the invention more particularly described here.

The device 20 allows separation between the liquid part and the dry matter of the sludge fed at 21 in continuous flow at a rate $Q_{EB}$=V/h, the feeding at 21 subsequently dividing in two to feed the ports 22.

More specifically, the device 20 comprises a closed, stainless steel chamber E with a volume v of less than 20 times V, for example of 55 liters for a rate Q=V/h of 1.5 m³/h, comprising at least two identical opposite orifices or ports 22, situated in the lower half 23 of the chamber, at a distance for example which is equal to one third of the height of the chamber.

The chamber is composed for example of a cylindrical part 24 which is terminated at the top part and at the bottom part by two identical conical zones 25, with angles at the vertex of the order of 120°, for example.

Each end is itself terminated by an upper tube 26 and lower tube 27. The lower tube 27 is connected to a pipeline 28, equipped with a sliding valve 29, for intermittent removal of the dry matter 30, which would have been decanted, in the base 27 of the chamber.

The device 20 further comprises means 31 for feeding air 32 to the chamber at a rate d below the orifices 22.

This feeding takes place, for example, by way of a rectilinear pipe or tube 33, with a small diameter, of 5 cm in diameter, for example, and with a length substantially equal to the diameter of the cylindrical chamber, comprising regularly spaced nozzles 34, for exit of the compressed air into the chamber in a distributed way, creating substantial bubbles which will give rise to substantial agitation (swirls 35).

Means 36, known per se, for feeding a liquid reagent 37, a coagulant, for example, are provided. These means are formed, for example, by a storage tank 38, which feeds by means of a metering pump 39 and a remote-controlled slide valve 40, the interior of the chamber above the ports 22, in the turbulence zone.

The device 20 further comprises means 41 for removing continuously the liquid that has penetrated the chamber, by way of a slide valve or other valve 42, which opens above a specified pressure in the chamber, of 1.3 bar, for example.

It is also possible not to provide a slide valve, with the circuit downstream itself constituting the head loss required to maintain the chamber in relative overpressure.

The effluent 43 is then removed at the top part, ending up in a settling vat 44 which is known per se.

For example, this settling vat 44 is composed of a cylindrical tank 45 into which the removal pipe 46 opens below the operating level 47, in order to limit turbulences.

The vat 44 itself discharges via overflow at 48, through a nonturbulent side tank portion 49, which is separated from the rest of the tank by an openwork wall by location.

The settled solid matter 50 is removed at the bottom part 51, and can be treated subsequently.

Figure 3:
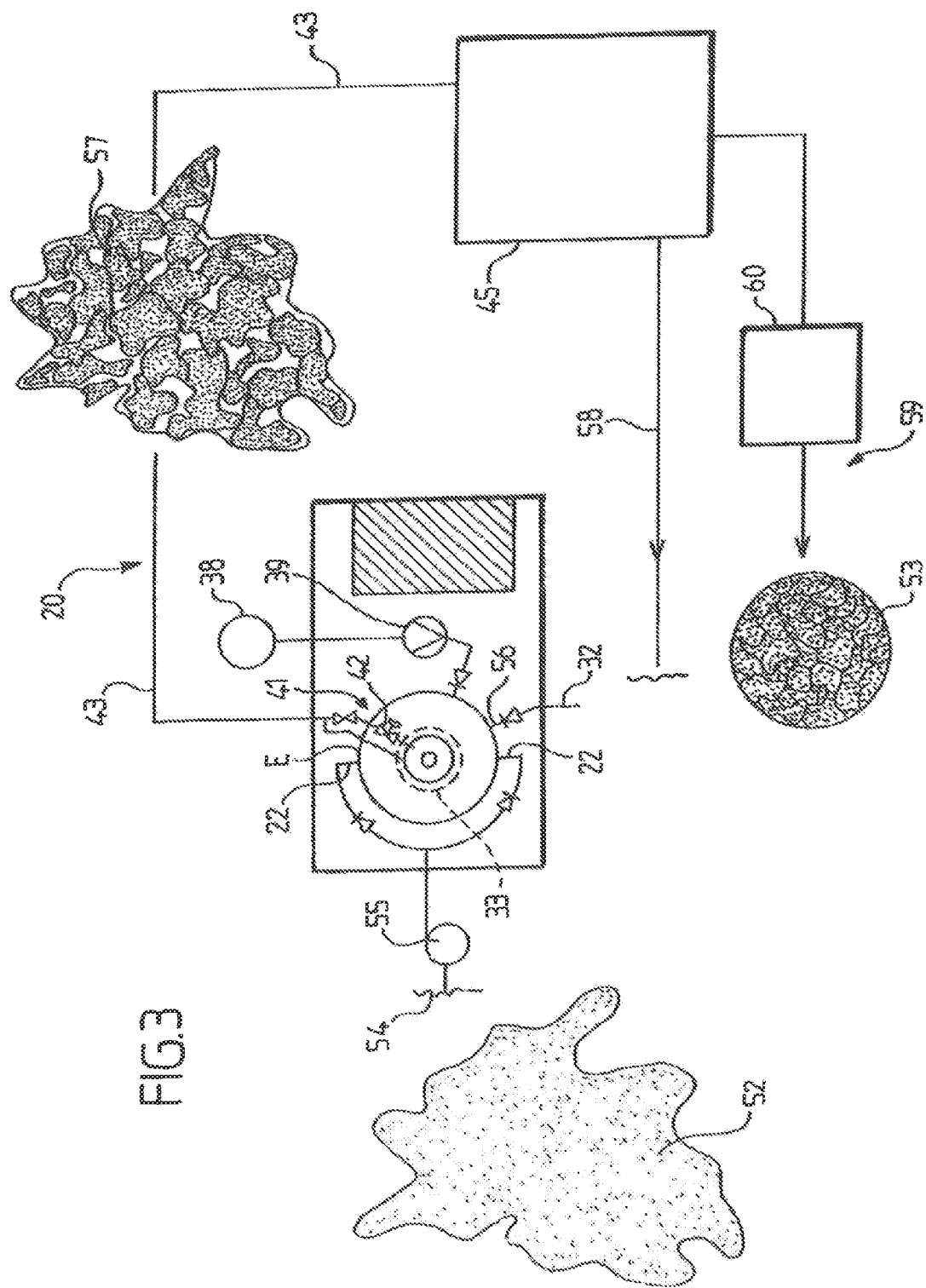
FIG. 3 is a schematic view illustrating the conversion of a sludge, using a device according to the invention.

FIG. 3, in a plan view, shows the device 20 of FIG. 2 which, from the sludge 52, produces the pancake 53, according to the invention.

In the remainder of the description, the same references will be used to denote the same elements.

Starting from the sludge or effluent 52 loaded with dry matter, which is pumped into an environment 54 by means of a pump 55 having a height of water $H_o$ at a rate $Q_{EB}$, the chamber E is fed by way of the two ports 22 which are situated opposite, facing one another. At each port, therefore, the rate is divided by two $Q_{EB}/2$.

The feed of air 32 is made below the ports, as described above, via a port 56.

A reagent (coagulant such as ferric chloride, or lime), which is known per se and should be adapted by the skilled person depending on the effluents treated, is fed continuously into the chamber E from the vat 38 via the metering pump 39.

Following treatment in the chamber as described above, the effluents are removed at the top part, at 41, to give the defragmented, decolloidized effluent 57 as shown schematically in FIG. 3.

This decolloidized and defragmented effluent is then fed into the settling vat 45. Following decanting, which takes place continuously within several seconds, the water then observed at 58 is extremely clear, transmitting, for example, 99% of the light which passes through it, or even 99.5%.

At 59, following possible complementary compacting treatment at 60, a particularly advantageous sludge cake is obtained, which is aerated and solidified and has an excellent porosity of between 5% and 15%.

A product of this kind obtained with the method according to the invention is new and will form matter for subsequent uses, as top soil, as a raw material in construction, etc.

With reference to FIG. 3, a description will now be given of the operation of a treatment regime in accordance with the embodiment of the invention more particularly described here.

From an environment, for example a stream 54 loaded with sludge 52, this sludge is extracted by pumping (55).

In one application example, the level of sludge, i.e., the percentage of dry matter in terms of solid material, is for example between 3 and 10%.

This sludge feeds the chamber E, for example of volume V=100 l, at a rate for example of between 5 and 50 m$^3$/h, for example 15 m$^3$/h.

As described above, this effluent is injected into the reactor via the two opposite ports 22. Simultaneously, air is fed via the lower ramp 33 of the reactor, with a rate greater, for example, than 25 Nm$^3$/h.

The pressure within the reactor is between 0.3 and 1.5 bar relative, for example greater than 0.8 bar relative, depending on the water level of the pump and/or pumps which feed the effluents, and also on the head loss created by the chamber itself and by the removal slide valve 42 which is situated at the top part of said chamber.

The pressure within the reactor may in particular be regulated by means of this upper slide valve or other valve.

The effluent, thus agitated and fed with air, remains in the reactor for a period corresponding to the relative ratio between the rates, the volume, and the pressure.

It is therefore retained, for example, for a residence time of several seconds, for example of less than 1 minute, before being removed.

This time may even be very much less, since with an effluent rate of greater than 20 m$^3$/h, residence within the chamber may for example be for a time of less than 10 seconds.

The sludge feed rate itself has a direct action on the percussion velocity, in accordance with the table produced above, given that the contact time and residence time in the reactor under pressure also affect the rate of formation of the flocs and their settling.

The rate of air and the effect of the pressure in the reactor are also elements which, with a view to the desired result, will be adapted, in a manner which is within the abilities of the skilled person.

When the sludges have been treated, they emerge from the reactor at a pressure corresponding to the flow pressure of the rate of the fluid in the pipe 43, to the settling vat 45, in which settling will take place in a manner known per se.

The water obtained as a supernatant is of a high purity and is itself removed continuously at 58.

The sludge obtained at the bottom part of the settling vat is removed either continuously or discontinuously, according to specified periods—for example, once a day.

The action of removing this sludge again very quickly increases its quality, particularly with regard to its good porosity.

The treatment carried out by virtue of the method and reactor according to the invention therefore yields a porous dewatered cake, with the recovered sludge being empty, dry, and manipulable. A number of hours are sufficient, as against three months in the context of the use of so-called conventional drying, to obtain a comparable result, and the features of the resulting sludge as well are much better with the invention, since the sludge is more readily recyclable.

As will be obvious, and as also results from the text above, the present invention is not limited to the embodiments that have been more particularly described. Instead, it encompasses all variants of those embodiments, and especially those in which the effluent feeding ports are three, four or more in number, rather than two in number, and are distributed regularly and angularly around the chamber.

The invention claimed is:

1. An apparatus for clarifying liquid or sludge that includes water, the apparatus comprising:
    a reactor defining a closed chamber and having a predetermined volume v, wherein the reactor has at least a first inlet configured to introduce a continuous flow of the liquid or the sludge into the closed chamber, and wherein the reactor has a second inlet configured to introduce air into the closed chamber;
    a first pumping means configured to pump, at a minimum rate of $Q_{EB}$, the continuous flow into the closed chamber, wherein the minimum rate $Q_{EB}$ is equal to $V_{EB}$/hour, wherein $V_{EB}$ is at least 20 v; and
    a second pumping means configured to pump, at a rate d, the air into the closed chamber simultaneously with the continuous flow;
    wherein the reactor has an outlet with a cross section more limited than that of the reactor, said outlet being provided with a pressure regulating means for regulating pressure in the closed chamber, and
    wherein the closed chamber, the first pumping means, the second pumping means, and the pressure regulating means are arranged to
        put the closed chamber in overpressure in relation to atmospheric pressure,
        generate, based on the simultaneous pumping of the continuous flow and the air into the closed chamber, a turbulent mixing of the liquid or the sludge with the air, wherein the turbulent mixing obtains a mixture of organic material and a portion of the air that is in suspension with water and is sufficient to cause treatment of colloidal structures present in the liquid or the sludge,
        circulate the mixture to the outlet, and
        discharge, via the outlet, at least a portion of the mixture.

2. An apparatus as claimed in claim 1, wherein the reactor has two opposite inlets located at the same height of the reactor and configured to, after division of the continuous flow into two partial flows, project the two partial flows such that the two partial flows interact with one another, wherein the first inlet is one of the two opposite inlets.

3. An apparatus as claimed in claim 1, wherein the chamber has a top and a bottom, and the outlet is located at the top of the chamber.

4. An apparatus as claimed in claim 1, wherein $V_{EB}$ is at least 50 v.

5. An apparatus as claimed in claim 1, wherein the minimum rate $Q_{EB}$ is greater than or equal to 15 m$^3$/h, the rate d is greater than or equal to 25 m$^3$/h, and the overpressure is greater than or equal to 0.8 bar.

6. An apparatus as claimed in claim 5, wherein the minimum rate $Q_{EB}$ is greater than or equal to 20 m$^3$/h, the rate d is greater than or equal to 50 m$^3$/h, and the overpressure is greater than 1.2 bar.

7. An apparatus as claimed in claim 1, wherein the rate d is greater than 1.5 $Q_{EB}$.

8. An apparatus as claimed in claim 1, further comprising:
    a collection container configured to:
        collect at least the portion of the mixture to allow for separation of solids and liquids,
        discharge, from the collection container, a liquid portion, and
        discharge, from the collection container and to a filtering or centrifuge apparatus, a solid portion; and
    the filtering or centrifuge apparatus configured to perform a treatment of the solid portion.

9. An apparatus as claimed in claim 1, wherein the pressure regulating means comprises a valve configured to open when the overpressure in the closed chamber exceeds a predetermined pressure.

10. An apparatus for clarifying liquid or sludge comprising organic material and water, the apparatus comprising:
    first pumping means configured to pump, at a minimum rate of $Q_{EB}$ and via at least a first inlet of a reactor that is closed and has a predetermined volume v, a continuous flow of the liquid or the sludge into the reactor, wherein the first inlet is between a top of the reactor and a bottom of the reactor, wherein the minimum rate of $Q_{EB}$ is equal to $V_{EB}$/hour, wherein $V_{EB}$ is at least 20 v,
    second pumping means configured to pump, at a rate d and via at least a second inlet of the reactor, air into the reactor,
    wherein the reactor comprises an outlet that has a cross section more limited than that of the reactor, said outlet being provided with a pressure regulating means for regulating pressure in the reactor, the pressure regulating means being arranged with the first inlet and the second inlet to:
        put the reactor in overpressure in relation to atmospheric pressure,
        produce, in the reactor by turbulent mixing of the liquid or the sludge with the air to cause treatment of colloidal structures present in the liquid or the sludge, a mixture of the organic material and a portion of the air that is in suspension with the water, and
        discharge, via the outlet, at least a portion of the mixture.

11. An apparatus as claimed in claim 10, wherein the reactor comprises two opposite inlets located at the same height of the reactor and configured to, after division of the continuous flow into two partial flows, project the two partial flows such that the two partial flows interact with one another, wherein the first inlet is one of the two opposite inlets.

12. An apparatus as claimed in claim 10, wherein the outlet is located at the top of the reactor and includes a tube portion that is configured to discharge the at least the portion of the mixture along an axis formed by a chamber body portion of the reactor, wherein the chamber body portion extends between the top of the reactor and the bottom of the reactor.

13. An apparatus as claimed in claim 10, wherein $V_{EB}$ is at least 50 v.

14. An apparatus as claimed in claim 10, wherein the rate $Q_{EB}$ is greater than or equal to 15 m³/h, the rate d is greater than or equal to 25 m³/h, and the overpressure is greater than or equal to 0.8 bar.

15. An apparatus as claimed in claim 14, wherein the rate $Q_{EB}$ is greater than or equal to 20 m³/h, the rate d is greater than or equal to 50 m³/h, and the overpressure is greater than 1.2 bar.

16. An apparatus as claimed in claim 10, wherein the rate d is greater than 1.5 $Q_{EB}$.

17. An apparatus as claimed in claim 10, further comprising means for continuously adding, to the reactor at a rate q, at least one liquid reagent.

18. An apparatus as claimed in claim 17, wherein the at least one liquid reagent comprises a flocculent, and wherein the means for continuously adding the at least one liquid reagent is for adding, in a proportion between 0.05% and 0.1% of dry matter content of the liquid or the sludge, the flocculant to a turbulence zone of the reactor.

19. An apparatus for clarifying liquid or sludge that includes water, the apparatus comprising:
    a reactor defining a closed chamber and having a predetermined volume v, wherein the reactor has a first end, a second end, and a chamber body portion that extends between the first end and the second end along an axis, wherein the reactor has at least a first inlet configured to introduce a continuous flow of the liquid or the sludge into the closed chamber, and wherein the reactor has a second inlet configured to introduce air into the closed chamber;
    a first pumping means configured to pump, at a minimum rate of $Q_{EB}$, the continuous flow into the closed chamber, wherein the minimum rate $Q_{EB}$ is equal to $V_{EB}$/hour, wherein $V_{EB}$ is at least 20 v; and
    a second pumping means configured to pump, at a rate d, the air into the closed chamber simultaneously with the continuous flow;
    wherein the first end is configured with an outlet that has a cross section more limited than that of the reactor, wherein the outlet is provided with a pressure regulating means for regulating pressure in the closed chamber, wherein the outlet includes a tube portion configured to discharge from the reactor along the axis, and
    wherein the closed chamber, the first pumping means, the second pumping means, and the pressure regulating means are arranged to
        put the closed chamber in overpressure in relation to atmospheric pressure,
        generate, based on the simultaneous pumping of the continuous flow and the air into the closed chamber, a turbulent mixing of the liquid or the sludge with the air, wherein the turbulent mixing obtains a mixture of organic material and a portion of the air that is in suspension with water and is sufficient to cause treatment of colloidal structures present in the liquid or the sludge,
        circulate the mixture to the outlet, and
        discharge, via the tube portion of the outlet and along the axis, at least a portion of the mixture.

20. The apparatus of claim 19, wherein the axis is a vertical axis.

* * * * *